(12) United States Patent
Binns

(10) Patent No.: US 7,792,845 B1
(45) Date of Patent: Sep. 7, 2010

(54) NETWORK ACCELERATION DEVICE HAVING LOGICALLY SEPARATE VIEWS OF A CACHE SPACE

(75) Inventor: Roger Binns, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 684 days.

(21) Appl. No.: 11/369,712

(22) Filed: Mar. 7, 2006

(51) Int. Cl.
*G06F 7/00* (2006.01)
*G06F 17/00* (2006.01)

(52) U.S. Cl. .................................... 707/754; 707/783
(58) Field of Classification Search ................ None
See application file for complete search history.

(56) References Cited

U.S. PATENT DOCUMENTS

| | | | |
|---|---|---|---|
| 5,544,342 A * | 8/1996 | Dean ........................ 711/119 |
| 5,878,252 A * | 3/1999 | Lynch et al. ................ 712/225 |
| 6,012,052 A * | 1/2000 | Altschuler et al. ............. 707/2 |
| 6,236,996 B1 * | 5/2001 | Bapat et al. .................... 707/9 |
| 6,539,382 B1 * | 3/2003 | Byrne et al. .................. 707/10 |
| 6,792,436 B1 * | 9/2004 | Zhu et al. .................... 707/203 |
| 2002/0138565 A1 * | 9/2002 | Kustov et al. ............... 709/203 |
| 2003/0115281 A1 * | 6/2003 | McHenry et al. ............ 709/213 |
| 2003/0115421 A1 * | 6/2003 | McHenry et al. ............ 711/133 |
| 2006/0136472 A1 * | 6/2006 | Jujjuri et al. ................ 707/102 |
| 2006/0195660 A1 * | 8/2006 | Sundarrajan et al. ........ 711/118 |

* cited by examiner

*Primary Examiner*—John R. Cottingham
*Assistant Examiner*—Nicholas E Allen
(74) *Attorney, Agent, or Firm*—Shumaker & Sieffert, P.A.

(57) ABSTRACT

A network acceleration device is described that caches resources (e.g., files or other content) to a cache space organized into logically separate views. The views represent an abstraction that defines sets of the cached resources according to the client devices that requested the resources. The network acceleration device associates each view with a specific client device or user, and caches content requested by that specific user to the user's associated view. The network acceleration device herein may achieve a higher level of caching and increased network acceleration over a conventional network acceleration device that maintains a single cache space and shares content among multiple client devices.

20 Claims, 6 Drawing Sheets

NETWORK ACCELERATION DEVICE HAVING LOGICALLY SEPARATE VIEWS OF A CACHE SPACE

TECHNICAL FIELD

The invention relates to data storage and, more particularly, to caching data within a network device.

BACKGROUND

In a typical network environment, client devices request and download content stored within network servers. Exemplary content includes web pages that may contain one or more of text, graphics, video, and sound data. Other examples of content include files, multimedia data streams (e.g., audio or video data streams), electronic messages, and data tables. Upon receiving the content requests, the network servers typically retrieve the requested content, break the requested content into packets, and transmit the packets to the requesting client device. Routers and other network infrastructure direct these packets through the network to the client devices, which, in turn, reconstruct the content from the packets and present the content to users via applications residing on the client devices.

The network may experience a variety of issues that result in decreased download speeds at the client devices. These issues include a large volume of content requests that overload or otherwise diminish the capacity of a network server to timely service the requested content, general network congestion and limited network bandwidth, and the physical distance separating the client and the server. To increase download speeds, the network may employ one or more intermediate network acceleration devices located between the client devices and the servers to address the above listed issues or other issues that adversely effect download speeds.

For example, an intermediate network acceleration device may cache content when a client device first requests the content. The network acceleration device provides a single cache space with the goal of sharing content between client devices. For example, after caching certain content, the network acceleration device may intercept subsequent requests from other clients for that same content and provide the cached content to the requesting client devices, thereby avoiding additional accesses to the servers. In this manner, the network acceleration device seeks to utilize the shared cache space to increase the overall efficiency and responsiveness of delivering content to the clients.

SUMMARY

In general, the principles of the invention relate to a network acceleration device that allows for caching content to a cache space having logically separate user-specific views. The user-specific views represent an abstraction that the network acceleration device maintains above one or more cache spaces. The network acceleration device associates each view with a specific user of a client device and caches content requested by that specific user to the user's associated view.

In this manner, the network acceleration device may cache multiple versions of the same content to logically separate views. The network device may be able to cache additional content that could not be cached to a shared cache space and shared between multiple clients due to security issues. Thus, the network acceleration device herein may achieve a higher level of caching and increased network acceleration over a conventional network acceleration device that maintain a single cache space and shares content among multiple client devices.

In addition, the logically separate views allow the network acceleration device described herein to pre-fetch content on a user-specific basis. As a result, the network acceleration device may achieve higher levels of pre-fetch traffic as compared to conventional network acceleration device that shares a single view among multiple client devices.

In one embodiment, a network device comprises a cache storing a plurality of network resources organized into a plurality of views. The views are associated with different client devices and define logically separate sets of the resources stored in the cache in response to previous requests received from the corresponding client devices. A cache manager executing within the network device services a subsequent request from any of the client devices using the set of cached resources associated with requesting client device according to the respective view of the client device without regard to the set of resources associated with the other client devices by the other views.

In another embodiment, a method includes receiving a plurality of requests with an intermediate network device located between a plurality of client devices and a network server to which the content request are directed. The method further includes requesting resources from a network in response to the requests, and storing the resources to a cache of the intermediate network device. In addition, the method includes associating the cached resources with one of a plurality of views that define logically separate sets of the resources according to the client devices that requested the resources.

In another embodiment, the invention is directed to a computer-readable medium comprising instructions. The instructions cause a programmable processor to receive a plurality requests with an intermediate network device located between a plurality of client devices and a network server to which the content request are directed. The instructions further cause the processor to request resources from a network in response to the requests, store the resources to a single cache space of the intermediate network device, and associate the cached resources with one of a plurality of views that define logically separate sets of the resources according to the client devices that requested the resources. In addition, the instructions cause the processor to service a subsequent request for a resource by determining whether a cache miss occurs based upon the set of resources associated with the view of the requesting client without regard to whether the resource is already stored in the single cache space but associated with a different one of the views.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
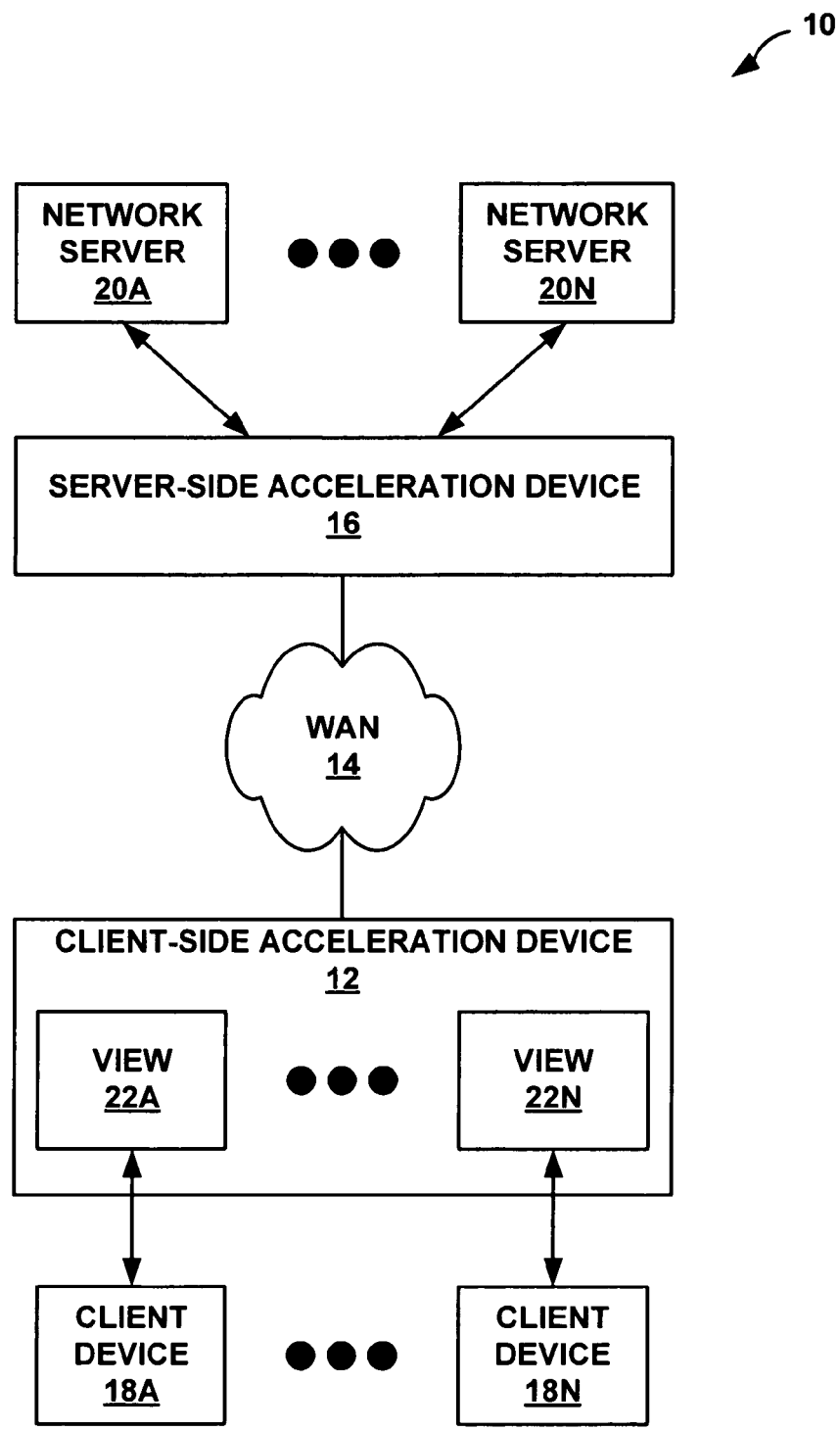
FIG. 1 is a block diagram illustrating an exemplary network system in which a client-side acceleration device operates in accordance with the principles of the invention.

FIG. 1 is a block diagram illustrating an exemplary network system 10 in which a client-side acceleration device 12 operates in accordance with the principles of the invention. In this example, network system 10 includes a wide area network 14 ("WAN 14") that connects client-side acceleration device 12 to a server-side acceleration device 16. Client-side acceleration device 12 couples to client devices 18A-18N ("client devices 18"), and server-side acceleration device 16 couples to network servers 20A-20N ("network servers 20"). Through client-side acceleration device 12, WAN 14, and server-side acceleration device 16, client devices 18 communicate with network servers 20 to retrieve data; however, typically, client devices 18 and network servers 20 are unaware of client-side acceleration device 12 and server-side acceleration device 16. In other words, client-side acceleration device 12 and server-side acceleration device 16 operate transparently to client devices 18 and network servers 20.

Client-side acceleration device 12 and server-side acceleration device 16 may represent any network devices capable of accelerating the transfer of data across WAN 14. In some embodiments, network system 10 may comprise only one network acceleration device, and, in these embodiments, typically only client-side acceleration device 12 exists to accelerate the transfer of data to client devices 18.

Client devices 18 may comprise any number of personal computers, laptops, workstations, wireless devices, personal digital assistants (PDAs), cellular phones, network ready appliances, or other devices. Network servers 20 may comprise web servers, mail servers, database servers, file servers, and other such common server types that store content, such as web pages, electronic messages, data tables, and files, respectively.

In the example of FIG. 1, client-side acceleration device 12 maintains views 22A-22N ("views 22"), where the term "view" refers to a logically separate cache within client-side acceleration device 12. Client-side acceleration device 12 maintains a respective one of views 22 for each user (not shown in FIG. 1) operating one or more of client devices 18. In some embodiments, client-side acceleration device 12 maintains a respective one of views 22 for each of client devices 18 and views 22 do not correspond with individual users. Typically, views 22 exist as a logical abstraction upon one or more physical caches (not shown in FIG. 1) that reside within client-side acceleration device 12. That is, views 22 provide data structures for associating logically separate sets of cached content with respective users of client devices 18. Caching operations, such as pre-fetch operations, cache misses, and cache flushes, are determined on a per-view basis and not with respect to a shared cache space regardless of the underlying data organization. Through user-specific views 22, client-side acceleration device 12 may more efficiently cache data, as described below.

Initially, client-side acceleration device 12 may receive a request for content from one of client devices 18 and, in response to the request, create one of views 22. For example, client 18A may request content that resides upon network server 20N, and client-side acceleration device 12 may create view 22A, thereby providing the user operating client device 18A with a user-specific logically separate cache. Client-side acceleration device 12 may customize view 22A based on certain characteristics of client device 18A, such as the type of protocols client device 18A supports and any rules specified by the respective user with respect to the type of content to cache.

While creating view 22A, client-side acceleration device 12 forwards the content request from client device 18A to server-side acceleration device 16 via WAN 14. Upon receiving the content request, server-side acceleration device 16 forwards the request to network server 20N, which typically responds by sending a block of the requested data to server-side acceleration device 16. In some embodiments, server-side acceleration device 16 tokenizes, or compresses, the blocks of data by analyzing the blocks of requested data to determine whether client-side acceleration device 12 already maintains this data within its cache. For those blocks of data already stored by client-side acceleration device 16, server-side acceleration device 16 compresses data transmissions by only sending an identification token to client-side acceleration device 12 via WAN 14. The tokens indicate the location within the cache of client-side acceleration device 12 that stores the block of requested data. Further details of the compression techniques using dual acceleration devices can be found in U.S. application Ser. No. 09/915,939, entitled "NETWORK ARCHITECTURE AND METHODS FOR TRANSPARENT ON-LINE CROSS-SESSIONAL ENCODING AND TRANSPORT OF NETWORK COMMUNICATIONS DATA" filed Jul. 25, 2001, the entire contents of which is incorporated herein by reference.

Upon receiving the blocks of requested data, client-side acceleration device 12 stores the block to the underlying caching space and forwards the resource (e.g., file) to client device 18A. If during this process, client-side acceleration device 12 receives one or more tokens, it retrieves the blocks of data referenced by the tokens to reassemble the resource and forwards the resource client device 18A. In either case, client-side acceleration device 12 updates view 22A to associate the requested cached resource with client device 18A. This above-described process may continue until client device 18A receives the requested content in its entirety.

After completing the transfer of the requested content to client device 18A, client-side acceleration device 12 may receive a request from client device 18N, for example, for the same content as client device 18A requested. Because the previously requested resource has been associated with view 22A, this subsequent request generates a cache miss. As a result, client-side acceleration device 12 may respond to the request in a manner similar to that described above in reference to client device 18A and may create and customize view 22N to provide a user-specific logically separate cache space for client device 18N. After requesting and caching another version of the resource and updating view 22N, client device 18N may edit the requested content and even upload the edited requested content to client-side acceleration device 12 for storage on network server 20N.

Assuming for purposes of illustration that client device 18A requests the same content once again, client-side acceleration device 12 receives the request and forwards the content cached in view 22A to client device 18A even though client device 18N edited this content prior to client device 18A's request. Thus, unlike a conventional acceleration device that maintains a single cache for all of its client devices to share, client-side acceleration device 12 maintains a plurality of user-specific logically separate cache spaces, i.e., views 22, to facilitate more efficient transfers of content by enabling separate versions of cached content to exist for each of client devices 18. Conventional network acceleration devices typically only allow one version of cached content to exist and invalidate the cached content once a client device edits and uploads this content, thereby requiring the conventional network acceleration device to download and cache this content again upon receiving a subsequent request for this content. Because client-side acceleration device 12 maintains separate views 22 and need not download and cache content after it has been edited by one of client devices 18, client-side acceleration device 12 may more efficiently accelerate the transfer of content to client devices 18.

Figure 2:
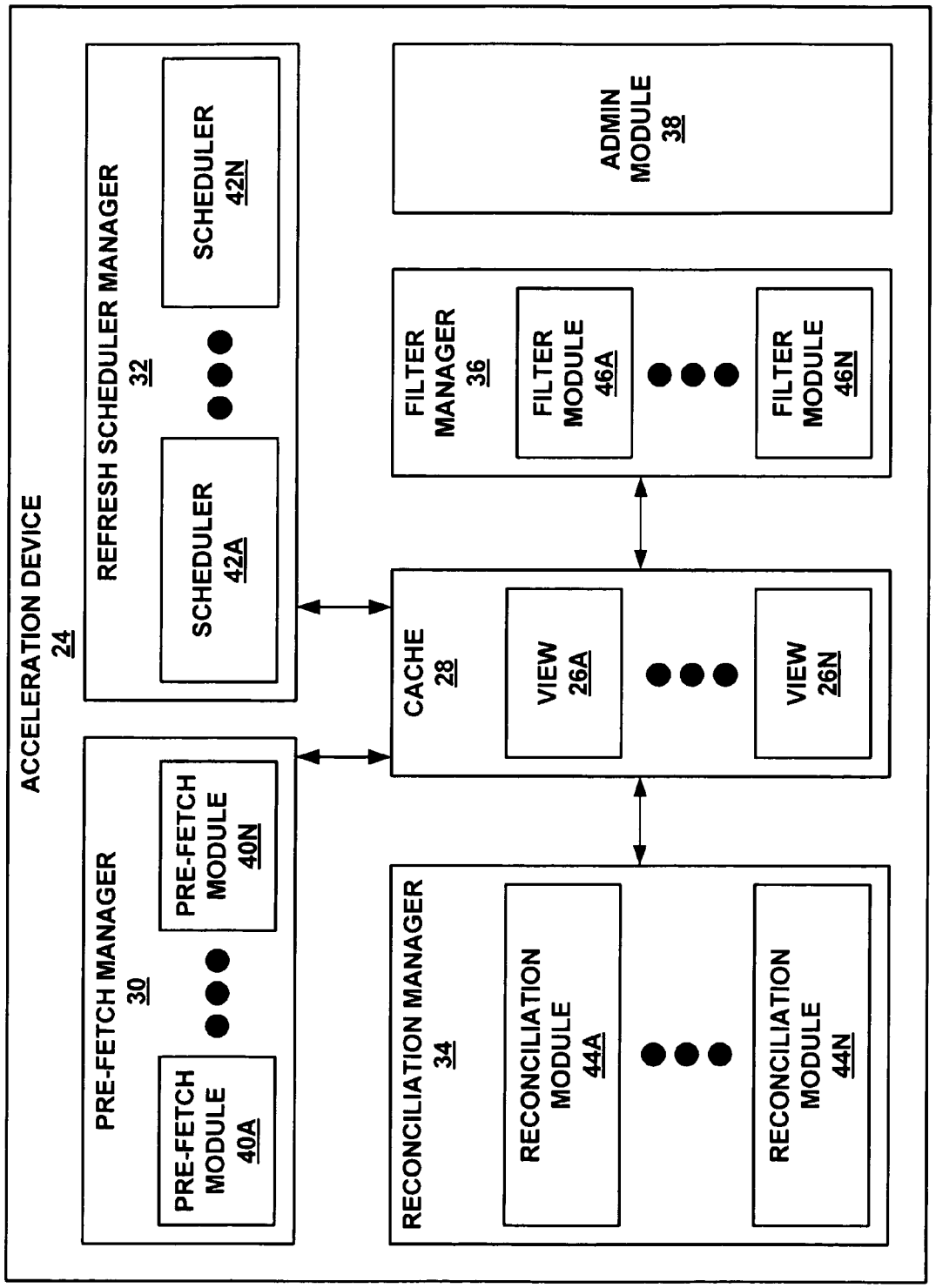
FIG. 2 is a block diagram illustrating an example embodiment of the acceleration device of FIG. 1.

FIG. 2 is a block diagram illustrating an example acceleration device 24 that operates in accordance with the principles of the invention. In this example embodiment, acceleration device 24 maintains a cache 28 that provides a plurality of logically separate views 26A-26N ("views 26") to more efficiently accelerate traffic to client devices, such as client devices 18.

As shown in FIG. 2, acceleration device 24 includes cache 28 that maintains views 26. Cache 28 may comprise an in-memory cache, or, in other words, a cache that functions without relying exclusively on static memory, such as a hard drive, but within a dynamic memory, such as random access memory (RAM), dynamic RAM (DRAM), and synchronous DRAM (SDRAM). In other embodiments, cache 28 may comprise static memory or both static and dynamic memory.

Acceleration device 24 also includes a pre-fetch manager 30, a refresh scheduler manager 32, a reconciliation manager 34, a filter manager 36, and an administration ("admin") module 38. The functions of pre-fetch manager 30 are partitioned into pre-fetch modules 40A-40N ("pre-fetch modules 40"), where each of pre-fetch modules 40 correspond to a respective one of views 26. Pre-fetch modules 40 perform the necessary operations to pre-fetch blocks of data from network servers, such as network servers 20, as respective clients request resources. Although shown as separate modules, each of pre-fetch modules 40 may represent a separate process, thread or even a single software function capable of separately operating on each of views 26 based on a view identifier.

Similarly, the functions of refresh scheduler manager 32 are partitioned into a plurality of schedulers 42A-42N ("schedulers 42"), where each of schedulers 42 correspond to a respective one of views 26. Schedulers 42 coordinate the refreshing of data stored to its respective one of views 26. Reconciliation manager 34 manages reconciliation modules 44A-44N ("reconciliation modules 44"), where each of reconciliation modules 44 correspond to a respective one of views 26. Reconciliation modules 44 implement reconciliation policies that determine the actions of acceleration device 24 in instances where data conflicts arise within cache 28.

Filter manager 36 includes filter modules 46A-46N ("filter modules 46"), where each of filter modules 46 correspond to a respective one of views 26. Filter modules 46 may selectively filter data based on view-specific rules, thereby preventing data from being stored to their respective views 26. Admin module 38 may allow an administrator to configure each of cache 28, pre-fetch manager 30, refresh scheduler manager 32, reconciliation manager 34, and filter managers 36. In other embodiments, admin module 38 may automatically configure the above cache and managers according to pre-defined scripts.

Initially, an administrator configures acceleration device 24 via admin module 38 to enable views 26 within cache 28. For example, via admin module 38, the administrator may configure one or more of pre-fetching rules via pre-fetch manager 30, set a default refresh rate that refresh scheduler manager 32 applies when creating schedulers 42, set a default reconciliation policy that reconciliation manager 34 applies when creating reconciliation modules 44, and set default filter specifications that filter manager 36 applies when creating filter modules 46.

Once the administrator configures acceleration device 24, acceleration device 24 may begin servicing client requests from clients, such as clients 18. Client 18A, for example, may transmit a content request intended for server 20N, and acceleration device 24 may transparently intercept this content request. Acceleration device 24 first determines whether it has assigned one of views 26 to the user operating client device 18A. In other embodiments, instead of associating views 26 with a specific user operating client device 18A, acceleration device 24 may determine whether it has assigned client device 18A one of views 26 and the principles of the invention should not be limited as such.

If the user operating client device 18A has not been assigned one of views 26, admin module 38 causes cache 28 to create a new view, e.g., view 26A, and assign view 26A to the user operating client device 18A. Admin module 38 may also analyze the content request to determine characteristics associated with the user and client device 18A, and may forward these characteristics to pre-fetch manager 30, refresh scheduler manager 32, reconciliation manager 34, and filter manager 36. Upon receiving these characteristics, each of managers 30-36 may dynamically instantiate a respective pre-fetch module, e.g., pre-fetch module 40A, scheduler, e.g., scheduler 42A, reconciliation module, e.g., reconciliation module 44A, and filter module, e.g., filter module 46A, for the user based on the specified characteristics. For example, admin module 38 may pass a file extension included within the content request to refresh scheduler manager 32, which in turn assigns a specific refresh rate to scheduler 42A based on the file extension. As another example, admin module 38 may forward configuration data specifying acceptable protocols, such as the wireless access protocol (WAP), to filter manager 36, which in turn dynamically instantiates and configures filter module 46A to limit the content stored to view 26A to content supported by the WAP.

While creating and assigning view 26A, acceleration device 24 may simultaneously forward the content request to WAN 14, which in turn, forwards the content request to server 20N via server-side acceleration device 16. Server 20N retrieves a first block of the content and transmits the block of data, which is intercepted by server-side acceleration device 16. Server-side acceleration device 16 may perform the tokenizing process described above and forward the associated tokens or may simply forward the blocks of data through WAN 14 to acceleration device 24.

Upon receiving the blocks of data, acceleration device 24 caches the block of data to view 22A according to filter module 46A, which may remove portions of the block of data, as described above. If acceleration device 24 receives tokens, acceleration device 24 accesses cache 28 using the tokens as a key to retrieve the blocks of data indicated by these tokens to reassemble the requested resource. In either case, acceleration device 24 forwards the resource to the requesting client device.

In some instances, pre-fetch module 40A may initiate processes to perform pre-fetching, i.e., to begin retrieving blocks of data corresponding to the requested content from server 20N prior, in some instances, to client device 18A indicating that it received the first block of data, simultaneous to the above retrieval and caching process. As acceleration device 24 receives these subsequent pre-fetched blocks of data, it may cache these pre-fetched blocks to view 26A according to filter module 46A, and forward these pre-fetched blocks once client device 18A indicates that it has successfully received the first block. This process may continue in this manner until cache 28 contains all blocks of data corresponding to the requested content.

Acceleration device 24 may subsequently intercept another request from client 18N, for example, that requests the same content as previously cached in view 26A for client 18A. Acceleration device 24 may perform the actions described above in reference to client 18A to determine whether it has assigned client 18N one of views 26, to create and assign a view, e.g., view 26N, upon a determination that none of views 26 correspond to client 18N, and to cache all of the blocks of data corresponding to the requested content in view 26N according to filter module 46N.

Subsequently, client 18N may upload an edited version of the cached content and request that server 20N store the edited version in place of the previous version. Acceleration device 24 may again intercept this request, forward the request through WAN 14 and server-side acceleration device 16 to server 20, and cache the edited version to view 26N. In caching the edited version, cache 28 may replace the previously requested content with the edited version, thereby retaining a consistent view of this content with respect to client 18N. In this manner, cache 28 may present, via views 26A, 26N, varying versions of requested content to clients 18A, 18N respectively, contrary to conventional caches, which may only present one view or, in other words, one version of requested content. By maintaining separate views, acceleration device 24 need not continuously re-cache requested content as clients 18 make changes to the requested content, thereby possibly saving considerable download and caching time. In the event that client 18A subsequently requests storage of its version, reconciliation manager 34 performs a reconciliation process, such as storing the most-recently changed version.

Throughout the above described process, schedulers 42A, 42N may indicate that respective views 26A, 26N need to be refreshed. Should scheduler 42N indicate a refresh after cache 28 caches the edited version of the requested content, scheduler 42N may cause acceleration device 24 to upload the edited version to server 20N. In some instance, both views 26A, 26N may store edited versions of the requested content, and reconciliation modules 44A, 44N may again need to determine whether to upload the edited versions stored to their respective views 26A, 26N according to predefined reconciliation policies. As noted above, a typical policy may indicate that reconciliation modules 44A, 44N should cause acceleration device 24 to upload the most recently edited version of the requested content. Other policies may indicate that reconciliation modules 44A, 44N should cause acceleration device 24 to upload both edited versions of the requested content by renaming both versions or adding extensions to both versions. In this manner, acceleration device 24 may maintain these inconsistent versions of the same requested content, thereby providing for the more efficient acceleration process described above.

Figure 3:
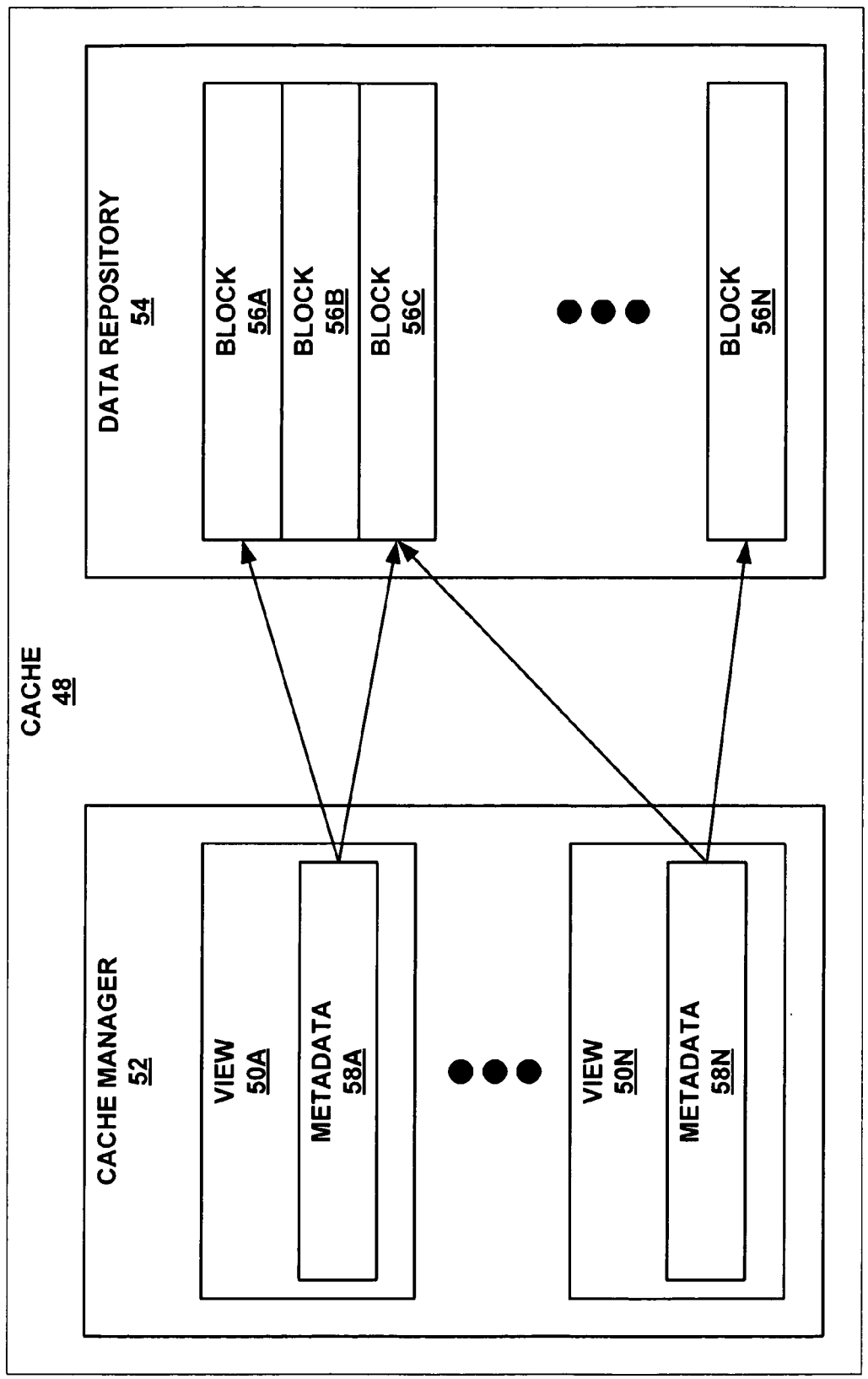
FIG. 3 is a block diagram illustrating an example cache that stores content according to views in accordance with the principles of the invention.

FIG. 3 is a block diagram illustrating an example cache 48 that stores content according to views 50A-50N in accordance with the principles of the invention. Cache 48 may be substantially similar to cache 28 of FIG. 2 and may utilize either or both of dynamic memory or static memory, as described above.

Cache 48 includes a cache manager 52 and a data repository 54, where cache manager 52 maintains data structures defining views 50A-50N ("views 50") and data repository 54 provides physical storage for blocks 56A-56N ("blocks 56"). In this example, views 50 each comprise respective metadata 58A-58N ("metadata 58") that contains pointers, or references, to one or more of blocks 56. For example, metadata 58A of view 50A points to blocks 56A, 56C, and metadata 58N of view 50N points to blocks 56C, 56N. Metadata 58, therefore, comprise the data and pointers necessary to indicate which of blocks 56 are associated with the logical views as well as which of the blocks form specific cached resources. In the example of FIG. 3, both metadata 58A, 58N point to the same block, i.e., block 56C, thereby enabling views 50 to forgo storing duplicate blocks of the same data, and instead store information that references a block of data stored by another of views 50. In the event a resource is updated for a particular view and a shared data block is updated and no longer equal for both views, then separate blocks are created and associated with the respective views.

As cache 48 receives requests to cache blocks of data to view 50A, for example, cache 48 stores the received block of data to one of blocks 56 of data repository 54 and passes the address of the one of blocks 56 that caches the data to cache manager 52. In turn, cache manager 52 assigns the address to one of the pointers within metadata 58A of view 50A. In this manner, cache 48 may maintain logically separate user-specific cache views, such as views 50, thereby enabling a network acceleration device, such as acceleration device 48 of FIG. 2, to more efficiently accelerate the transfer of data to client devices, such as client devices 18 of FIG. 1.

Figure 4A:
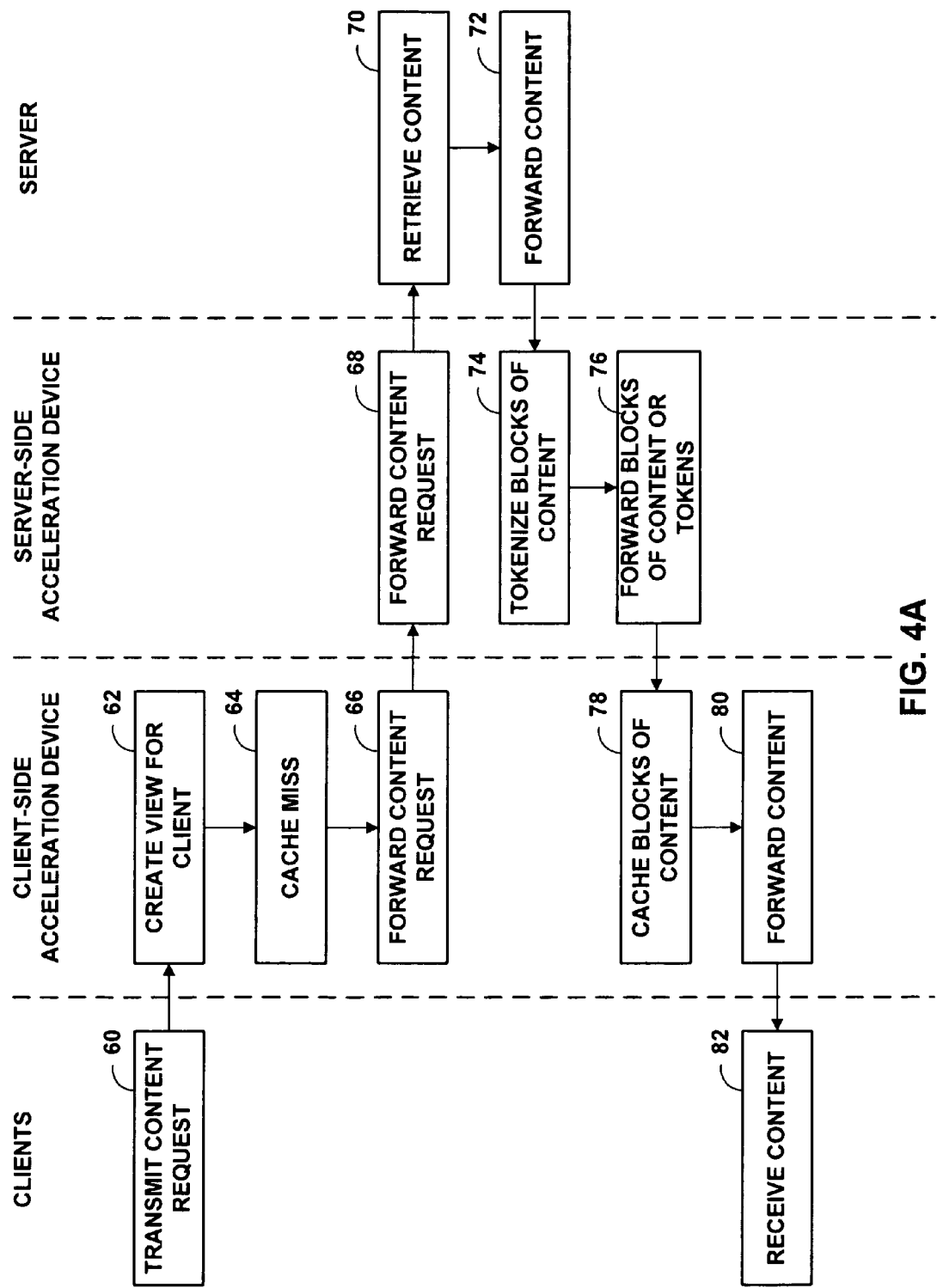
FIGS. 4A-4C are flowcharts illustrating exemplary operation of a network system in which an acceleration device within the network system maintains user-specific logically separate cache views.
Figure 4B:
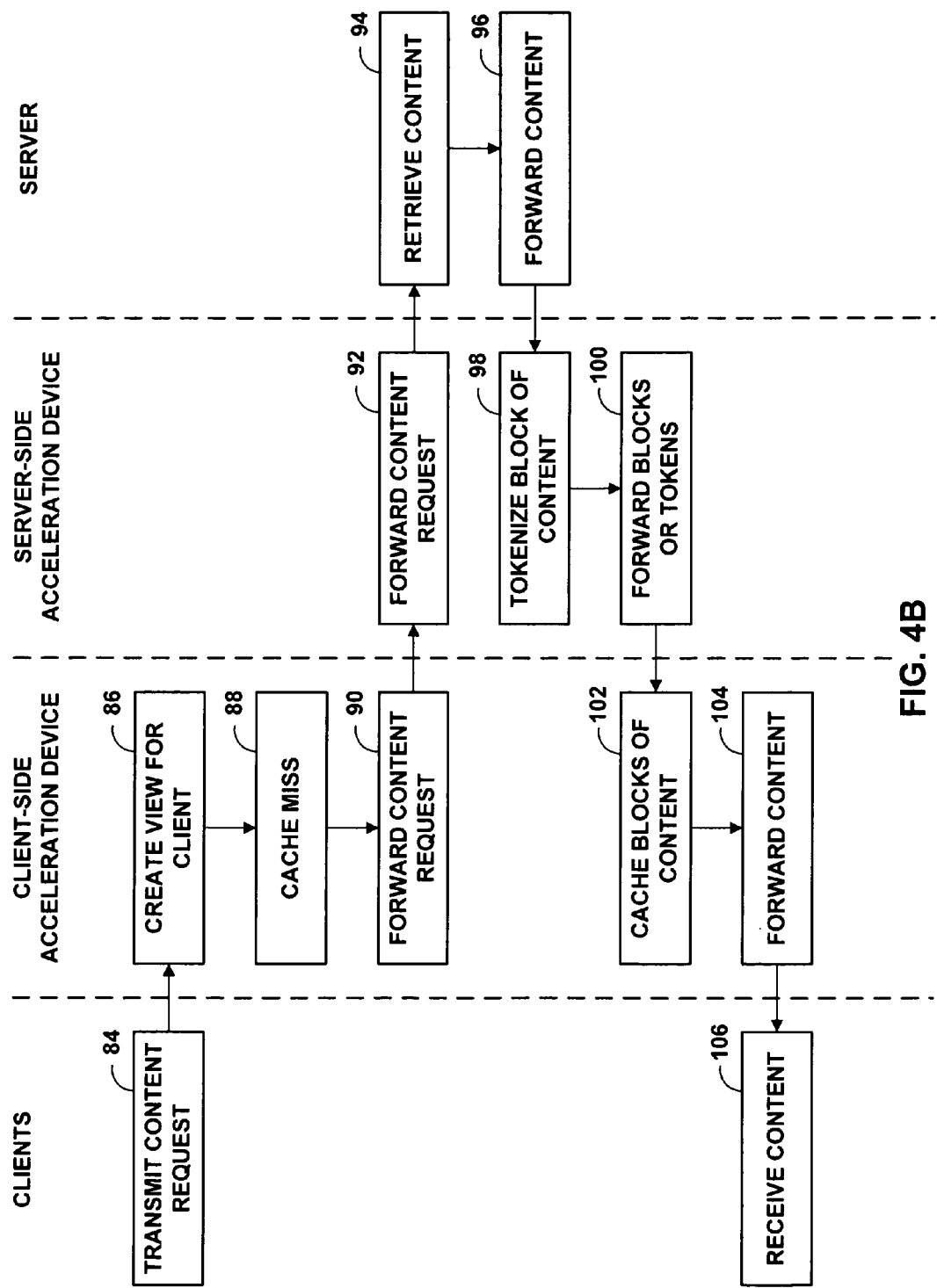
Figure 4C:
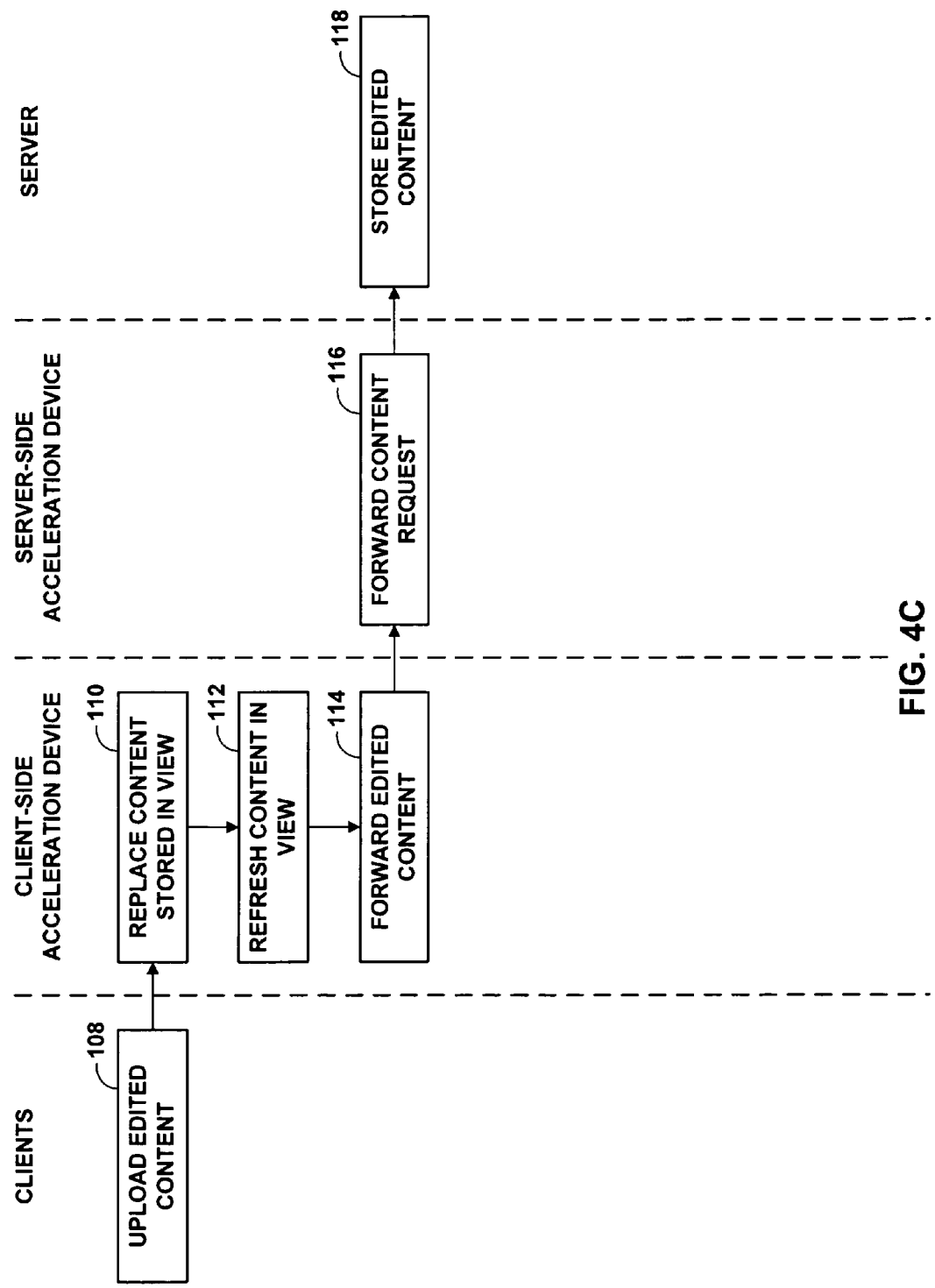

FIGS. 4A-4C are flowcharts illustrating exemplary operation of a network system, such as network system 10 of FIG. 1, in which an acceleration device within the network system maintains user-specific logically separate cache views. In particular, FIG. 4A is a flowchart illustrating the exemplary operation of the network system in which an acceleration device included within the network system caches a first version of the content requested by a first client device in a first view. FIG. 4B is a flowchart illustrating the exemplary operation of the network system in which the acceleration device caches the first version of the content requested by a second client device in a second view. FIG. 4C is a flowchart illustrating the exemplary operation of the network system in which the acceleration devices caches a second version of the content edited by the second client device to the second view. While described in reference to network system 10 of FIG. 1, the principles of the invention may apply to any configuration of a network system that includes a network device capable of accelerating the transfer of data to client devices.

Initially, a client device, such as client device 18A, transmits a content request requesting content from a server, such as server 20N (60). An acceleration device, such as client-side acceleration device 12, transparently intercepts the content request and determines whether one of views 22 correspond to the user operating client device 18A. Upon determining that none of views 22 correspond to the user, client-side acceleration device 12 may create a new view, such as view 22A, and assign view 22A to the user operating client device 18A (62). Because view 22A was newly created, no data exits within view 22A, and therefore, a cache miss results upon performing a lookup for the requested content within view 22A specified by the content request (64), and client-side acceleration device 12 forwards the content request to server-side acceleration device 16 via WAN 14 (66).

Upon receiving the content request, server-side acceleration device 16 forwards the content request to server 20N, which in turn retrieves the requested content and forwards the requested content to server-side acceleration device 16 (70, 72). Once it receives the requested content, server-side acceleration device 16 attempts to tokenize the blocks of content, as described above (74). During this process, server-side acceleration device 16 forwards the blocks of requested content in either tokenized form or in their entirety to client-side acceleration device 12 via WAN 14 (76).

Once it receives the block of requested content, client-side acceleration device 12 simultaneously caches the block of requested content and forwards the content to client device 18A (78, 80). In instances where client-side acceleration device 12 receives tokens, it first retrieves the portions of the block of requested content referenced by the tokens and assembles the blocks of requested content prior to forwarding the content. Client device 18A receives the content (82). In instances where pre-fetching has been configured, client-side acceleration device 12 may simultaneously forward a first block of requested content to client device 18 while pre-fetching subsequent blocks of the requested content, as described above. Thus, client-side acceleration device 12 may have already cached subsequent blocks of the requested content and may immediately provide these subsequent blocks, as a lookup in view 22A for the blocks that would result in a cache hit. This process may continue until client device 18 receives the requested content in its entirety.

After transferring the content to client device 18A, client device 18N may similarly transmit a request for the same content requested by client device 18A (84, FIG. 4B). Client-side acceleration device 12 receives the content request and, assuming for purposes of illustration that client device 18N has not previously transmitted a request, client-side acceleration device 12 determines that none of views 22 correspond to the user operating client device 18N and creates a view, e.g. view 22N, for client device 18N (86). Subsequently, client-side acceleration device 12 determines that the requested content does not reside within view 22N, i.e., a cache miss, and forwards the content request to server-side acceleration device 16, which in turn forwards the content request to server 20N (88-92).

Upon receiving the content request, server 20N retrieves the requested content and forwards the requested content to server-side acceleration device 16 (94, 96). As described above, server-side acceleration device 16 attempts to tokenize the requested content (98). In this instance, server-side acceleration device 16 may completely tokenize the block of requested data. Thus, server-side acceleration device 16 may forward the blocks of requested content via tokens to client-side acceleration device 12, which associates the tokens with view 22N (100, 102). Simultaneous to caching the tokens, client-side acceleration device 12 forwards the requested content by first accessing the portions of the block of content referenced by the tokens and assembling the content (104). Client device 18N receives the requested content. As described above, pre-fetching blocks of content may accelerate this process.

Once it receives the requested content, a client device, such as client device 18N, may edit the content and upload the edited version of the content to server 20N (108, FIG. 4C). Client-side acceleration device 12 transparently intercepts the uploaded content, and instead of forwarding the content to server 20N like a conventional acceleration device, it replaces the previously cached version of the requested content with the edited version of the requested content (110). In this manner, client-side acceleration device 12 may more efficiently cache data to facilitate an increased level of acceleration of data to client devices 18 because it does not have to download and re-cache the data upon the next request for that particular content.

At some later point, client-side acceleration device 12 may determine that the data stored within view 22N needs to be refreshed (112). In some embodiments, client-side acceleration device 12 may include a scheduler manager, similar to scheduler manager 32 of acceleration device 12 (FIG. 2), that manages a scheduler, such as scheduler 42N, for each of views 22. The scheduler may indicate that a refresh of the data within view 22N is necessary and, upon discovering that an edited version has been uploaded to view 22N, may cause client-side acceleration device 12 to forward the edited version of the content to server-side acceleration device 16 via WAN 14 (114). Server-side acceleration device 16 may forward the edited version of the content to server 20N, which in turn stores the edited content by replacing the previously requested version of the content with the edited version (116, 118).

In this manner, an acceleration device may more efficiently transfer data to client devices. As one example, the logically separate views may allow multiple versions of the same content to exist within a single cache space, thereby avoiding repeatedly downloading and caching content, as described above. Moreover, by offering user-specific filtering modules, an acceleration device may only cache data pertinent to a particular client device, which may significantly reduce the amount of data stored to a cache in some instances. For example, if a particular client device may only view certain types of data, as limited by its protocol or other characteristics, the filter module may eliminate the data that the client device may not support. Various embodiments of the invention have been described. These and other embodiments are within the scope of the following claims.

The invention claimed is:

1. A network device comprising:
a cache storing a plurality of network resources organized into a plurality of views, wherein the views are associated with different client devices and define logically separate sets of the resources stored in the cache in response to previous requests received from the corresponding client devices; and
a cache manager executing within the network device that stores a resource to the view associated with a first one of the client devices in response to servicing a first request for the resource from the first one of the client devices,
wherein, after storing the resource to the view associated with the first one of the client devices, the cache manager services a second request from a second one of the client devices different than the first one of the client devices using the set of cached resources associated with the second one of the client devices according to the respective view of the second one of the client devices without regard to the set of resources associated with the other client devices by the other views, wherein the second request requests the same resource requested by the first request,
wherein, in response to the second request, the cache manager determines whether the respective view associated with the second one of the client devices is already associated with a cached version of the same resource requested by the second request,
wherein the cache manager, upon determining that the view for the second one of the client devices is not already associated with the cached version of the requested resource, retrieves the requested resource from a server without regard to the cached version of the requested resource that is already stored within the cache but associated with the view corresponding to the first one of the client devices, and
wherein the cache manager stores the requested resource to the view associated with the second one of the client devices.

2. The network device of claim 1, wherein the plurality of views includes at least two views that have different copies of the same resource.

3. The network device of claim 1, wherein the views are specific to a plurality of users, and wherein the cache manager applies operations to the cache for a first one of the users based on the cached resources associated with the view of the first user without regard to the cached resources associated with the views of the other users.

4. The network device of claim 1,
wherein the cache provides a single cache space that provides storage space for blocks of data, and
wherein the cache manager defines the views as data structures having metadata that indicate which of the blocks form the cached resources and which of the resources are associated with the views.

5. The network device of claim 1, further comprising a pre-fetch manager that pre-fetches from the server blocks of data for a resource,
wherein the pre-fetch manager pre-fetches the blocks on a per-view basis for the resources associated with the different views.

6. The network device of claim 5, wherein the pre-fetch manager comprises a plurality of pre-fetch modules, each of the pre-fetch modules corresponding to a different one of the views of the cache and pre-fetching the blocks for the resources associated with the corresponding view.

7. The network device of claim 1, further comprising:
a filter that selectively prevents resources from being stored in the cache,
wherein the filter applies different rules for views to selectively discard the resources for each of the views.

8. The network device of claim 1, further comprising:
a scheduler that updates the resources being stored in the cache by reloading the resources from the server,
wherein the filter applies different rules for views to determine which resources to update for each of the views.

9. A method comprising:
receiving a plurality of requests with an intermediate network device located between a plurality of client devices and a network server to which the plurality of requests are directed;
requesting resources from a network in response to the plurality of requests;
storing the resources to a cache of the intermediate network device, wherein storing the resources includes storing a resource to the view associated with a first one of the client devices in response to servicing a first request for the resource from the first one of the client devices;
associating the cached resources with one of a plurality of views that define logically separate sets of the resources according to the client devices that requested the resources;
after storing the resource to the view associated with the first one of the client devices, servicing a second request form a second one of the client devices different than the first one of the client devices using the set of cached resources associated with the second one of the client device according to the respective view of the second one of the client devices without regard to the set of resources associated with the other client by the other views, wherein the second request requests the same resource requested by the first request;
in response to the second request, determining whether the respective view associated with the second one of the client devices is already associated with a cached version of the same resource requested by the second request; and
upon determining that the view for the second one of the client devices is not already associated with the cached version of the requested resource, retrieving the requested resource from the network server without regard to the cached version of the requested resource that is already stored within the cache but associated with the view corresponding to the first one of the client devices,
wherein storing the resources includes storing the requested resource to the view associated with the second one of the client devices.

10. The method of claim 9, wherein associating the cached resource with one of a plurality of views comprises:
determining a user that requested the resource;
selecting one of the views based on the determined user; and
updating metadata of the selected view to associate the cached resource with the selected view.

11. The method of claim 9, wherein associating the cached resource with one of a plurality of views comprises:
determining which of the client devices requested the resource;
selecting one of the views based on the determined client device; and
updating metadata of the selected view to associate the cached resource with the selected view.

12. The method of claim 9, further comprising:
receiving a subsequent request for a resource;
determining which of the client devices requested the resource;
selecting one of the views based on the determined client device;
determining whether the selected view for the requesting client device is already associated with a cached version of the requested resource without regard to whether the requested resource is already stored within the cache and associated with a different view; and
retrieving the requested resource when the requested resource is not associated with the selected view.

13. The method of claim 9, further comprising applying operations to the cache for a first view without regard to the cached resources associated with the other views.

14. The method of claim 13, wherein the operations applied for each view include determining a cache miss and flushing the cache.

15. The method of claim 9, further comprising:
maintaining the cache as a single cache space that provides storage space for blocks of data, and
defining the views as data structures having metadata that indicate which of the blocks form the cached resources and which of the resources are associated with the views.

16. The method of claim 9, further comprising:
simultaneously with delivering a data block from the intermediate network device to one of the client devices, pre-fetching other data blocks for the resources,
wherein pre-fetching comprises applying different rules for the views to determine when to pre-fetch the data blocks for the different views.

17. The method of claim 9, further comprising:
when receiving resources with the intermediate network device, applying rules to selectively discard the resources based upon the views with which the requesting client devices are associated.

18. The method of claim 9, further comprising applying view-specific rules to determine whether to update the cached resources associated with each of the views.

19. A computer-readable storage medium comprising instructions for causing a programmable processor to:
receive a plurality of requests with an intermediate network device located between a plurality of client devices and a network server to which the content request are directed;
request resources from a network in response to the requests;
store the resources to a single cache space of the intermediate network device, wherein storing the resources includes storing a resource to the view associated with a first one of the client devices in response to servicing a first request for the resource from the first one of the client devices;
associate the cached resources with one of a plurality of views that define logically separate sets of the resources according to the client devices that requested the resources;
after storing the resource to the view associated with the first one of the client devices, service a second request form a second one of the client devices different than the first one of the client devices using the set of cached resources associated with the second one of the client device according to the respective view of the second one of the client devices without regard to the set of resources associated with the other client by the other views, wherein the second request requests the same resource requested by the first request;
in response to the second request, determine whether the respective view associated with the second one of the client devices is already associated with a cached version of the same resource requested by the second request; and
upon determining that the view for the second one of the client devices is not already associated with the cached version of the requested resource, retrieve the requested resource from the network server without regard to the cached version of the requested resource that is already stored within the cache but associated with the view corresponding to the first one of the client devices,
wherein storing the resources includes storing the requested resource to the view associated with the second one of the client devices.

20. A network device comprising:
a cache defining a single cache space that stores a plurality of network resources organized into a plurality of views, wherein each of the plurality of views are associated with a different one of a plurality of client devices, and wherein each of the plurality of views identify a logically separate set of the resources stored in the single cache space in response to previous requests received from the corresponding client devices such that each of the view into the cache is not shared by any of the other client devices, and
a cache manager executing within the network device, wherein the cache manager services a subsequent request from any of the client devices for a resource using only the set of cached resources associated with the requesting client device according to the respective view of the client device without regard to the set of resources associated with the other client devices by the other views by accessing only the set of resources identified by the respective view associated with the requesting client device,
wherein the cache manager, in response to determining that the respective view of the client device does not store the resource requested by the subsequent request, retrieves the resource requested by the subsequent request from the server without regard to the set of resources associated with the other client devices by the other views even though at least one of the other views stores the resource requested by the subsequent request.

* * * * *